(12) United States Patent
Zimmermann et al.

(10) Patent No.: US 12,362,989 B2
(45) Date of Patent: Jul. 15, 2025

(54) NETWORK BYPASS FRAMEWORK

(71) Applicant: ZPE Systems, Inc., Fremont, CA (US)

(72) Inventors: Arnaldo Zimmermann, Dublin, CA (US); Livio Ceci, Fremont, CA (US)

(73) Assignee: ZPE SYSTEMS, INC., Fremont, CA (US)

( * ) Notice: Subject to any disclaimer, the term of this patent is extended or adjusted under 35 U.S.C. 154(b) by 469 days.

(21) Appl. No.: 17/739,194

(22) Filed: May 9, 2022

(65) Prior Publication Data
US 2022/0360489 A1     Nov. 10, 2022

Related U.S. Application Data

(60) Provisional application No. 63/186,766, filed on May 10, 2021.

(51) Int. Cl.
| | |
|---|---|
| *H04L 41/0663* | (2022.01) |
| *G06F 13/38* | (2006.01) |
| *G06F 13/40* | (2006.01) |
| *G06F 13/42* | (2006.01) |

(52) U.S. Cl.
CPC ........ *H04L 41/0663* (2013.01); *G06F 13/382* (2013.01); *G06F 13/385* (2013.01); *G06F 13/4004* (2013.01); *G06F 13/409* (2013.01); *G06F 13/4282* (2013.01); *G06F 2213/0042* (2013.01)

(58) Field of Classification Search
CPC ..................................................... G06F 13/107
See application file for complete search history.

(56) References Cited

U.S. PATENT DOCUMENTS

| | | | |
|---|---|---|---|
| 2007/0061056 A1* | 3/2007 | Valsorda | ................. H04L 67/12 |
| | | | 701/20 |
| 2018/0015461 A1* | 1/2018 | Giri | ....................... H02M 3/155 |

* cited by examiner

*Primary Examiner* — Henry Tsai
*Assistant Examiner* — Juanito C Borromeo
(74) *Attorney, Agent, or Firm* — HORIZON IP PTE LTD.

(57) ABSTRACT

Framework for network bypass is disclosed herein. Exemplary network bypass apparatus may include a relay, a first connection interface connectable to a network device, a second connection interface connectable to a first communication device, and a third connection interface connectable to a second communication device. The network bypass apparatus may further include a housing enclosing the relay and the first, second and third connection interfaces, wherein the relay communicatively couples the first connection interface and the third connection interface while communicatively decoupling the first connection interface and the second connection interface in response to disconnection of power to the relay during a bypass mode.

20 Claims, 7 Drawing Sheets

Normal Mode

Bypass Mode

NETWORK BYPASS FRAMEWORK

CROSS-REFERENCE TO RELATED APPLICATION

This application claims the benefit of U.S. Provisional Application No. 63/186,766, filed May 10, 2021 entitled "Universal Serial Bus (USB) Port Management Framework," which is hereby incorporated by reference in its entirety.

BACKGROUND

A computer network is a set of communication devices sharing resources located on or provided by network nodes. The communication devices use common communication protocols over interconnections to communicate with each other. These interconnections are made up of telecommunication network technologies, based on physically wired, optical and wireless radio-frequency methods that may be arranged in a variety of network topologies.

A network switch (also known as switching hub or network hub) may be used to connect the communication devices on the computer network by using packet switching to receive and forward data to the destination communication device. The network switch may route data from a main network node to two communication devices by sending signals constantly to both communication devices. The network switch may be smart to send signals to the communication device that is logically responding to the messages (for example, based on the media access control or MAC Address), but this implies that the network switch has some level of intelligence and therefore it is probably more expensive. Moreover, the network switch can only operate when it is powered.

DETAILED DESCRIPTION

Some of the various embodiments of the present framework relate to computer networks, and more particularly to connecting communication devices with network devices on a computer network. One aspect of the present framework provides a network bypass apparatus and method. The network bypass apparatus may include a relay, a first connection interface connectable to a network device, a second connection interface connectable to a first communication device and a third connection interface connectable to a second communication device. The network bypass apparatus may further include an input power port for receiving power from an external power source and an output power port for providing power to an external device.

The relay may communicatively decouple the first connection interface and the third connection interface while communicatively coupling the first connection interface and the second connection interface in response to application of power to the relay via the input power port during a normal mode. The relay may communicatively couple the first connection interface and the third connection interface while communicatively decoupling the first connection interface and the second connection interface in response to disconnection of power to the relay via the input power port during a bypass mode.

By enabling normal mode or bypass mode via the network bypass apparatus, the network link may be easily switched from the first communication device to the second communication device, particularly during maintenance of the communication devices. The power to enable normal mode of the network bypass apparatus may be provided by the first communication device. Therefore, in case the first communication device stops providing power due to, for example, a power failure, a device hardware or software failure or a power cable disconnection, the network bypass apparatus enters the bypass mode. This causes the network link from the network device be routed to the second communication device.

The network bypass apparatus may be used at any place, such as a collocation environment, edge of the network point-of-presence, remote office, home and/or in any situation that may require a single network link from the network device to be re-routed between a primary communication device and a secondary communication device for the goal of keeping the network link available to the particular communication device in operation. These and other exemplary features and advantages will be provided in more details herein.

Figure 1A:
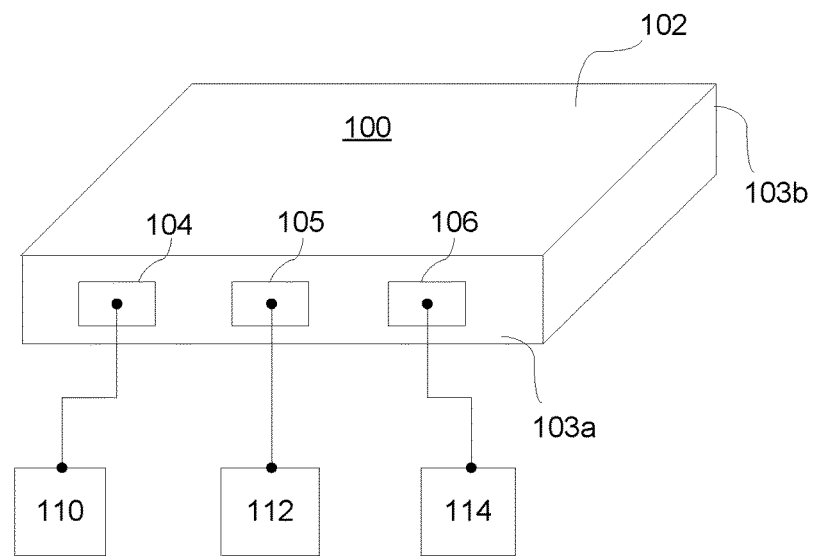
FIGS. 1a and 1b show first and second views of an exemplary network bypass apparatus.
Figure 1B:
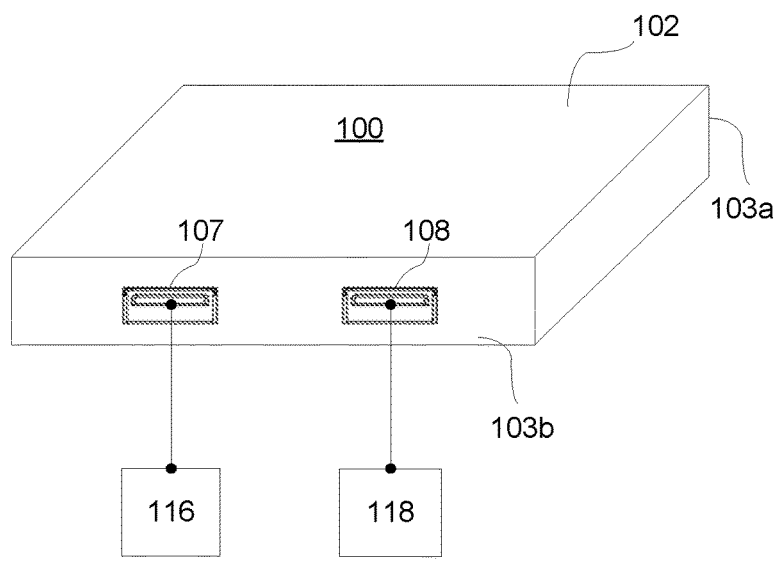

FIGS. 1a and 1b show first and second views of an exemplary network bypass apparatus 100. In some implementations, network bypass apparatus 100 includes a housing 102. Housing 102 may have a box-like shape or other geometric shape. Housing 102 is configured to enclose a relay (not shown), first, second and third connection interfaces (104, 105, 106), input power port 107 and output power port 108. First, second and third connection interfaces (104, 105, 106), input power port 107 and output power port 108 may be located on one or more sides of the housing 102. Although FIGS. 1a and 1b show the 3 connection interfaces (104, 105, 106) located on a one side 103a of the housing 102, while input power port 107 and output power port 108 are located on another side 103b of the housing 102, other configurations or number of connection interfaces are also possible. For example, first, second and third connection interfaces (104, 105, 106), input power port 107 and output power port 108 may be located on the same side of housing 102.

First, second and third connection interfaces (104, 105, 106) may include network ports for communicating network data to and from network device 110, as well as first and second communication devices (112 and 114) respectively. Such network ports may include, but are not limited to, RJ45 network copper port, fiber optic port, a small form-factor pluggable (SFP) port (e.g., RJ45 or copper SFP, fiber SFP port), an SFP+port, a serial port, an RS-232 serial port, an RS-485 serial port, an Ethernet port, a Local Area Network (LAN) port, a Wide Area Network (WAN) port, or a combination thereof. First, second and third connection interfaces (104, 105, 106) may also include non-network ports, such as serial or USB ports, since they can be routed by a single relay or group of relays working in coordination.

Input power port 107 may include a USB port for connecting to and receiving power from external power source 116. External power source 116 may provide power to both input power port 107 and first communication device 112. Output power port 108 may include a USB port for connecting to and providing power to external device 118. Other types of power ports are also useful. Alternatively, one or both of input power port 107 and output power port 108 may include a cable (e.g., USB cable) extending from the housing 102, with one end of the cable insertable into a power port (e.g., USB port) of external power source 116 and/or external device 118. Advantageously, by providing a pair of input power port 107 and output power port 108 for each network bypass apparatus 100, multiple network bypass apparatuses may be daisy chained, as will be described in more details herein.

First connection interface 104 is connectable to a network device 110. A network device 110 is a hardware device that connects communication devices to a network. Examples of a network device include, but are not limited to, a router, switch, modem, internet service provider (ISP) device, long term evolution (LTE) device, digital subscriber line (DSL) device, cable modem, firewall, Ethernet card, network card, repeater, gateway, or a combination thereof.

A network may include, for example, but not limited to, a local area network (LAN), a metropolitan area network (MAN) or a wide area network (WAN). In some implementations, the network is a wired network which uses IEEE 802.3 or Ethernet with protocols to control the passing of information and to avoid simultaneous transmission by two or more devices. The network may also be a wireless network that uses network technologies including, but not limited to, Wireless Fidelity (Wi-Fi), Gigabit Wireless (Gi-Fi), High Fidelity (Hi-Fi), Bluetooth®, worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), 3GPP universal mobile telecommunication system (UMTS), high speed packet access (HSPA), high speed downlink packet access (HSDPA), high speed uplink packet access (HSUPA), GSM (global system for mobile communications) EDGE (enhanced data rates for GSM evolution) radio access network (GERAN), UNITS terrestrial radio access network (UTRAN), LTE advanced (LTE-A), or a combination thereof.

Second and third connection interfaces (105, 106) are connectable to first and second communication devices (112, 114). The first and second communication devices (112, 114) are hardware devices that can communicate network data with another communication device over a computer network. Examples of a communication device include, but are not limited to, a router, firewall, gateway, network switch, another network device, computer, printer, fax machine, server, mobile device, compute node, load balancer, networking node, storage node, power node, cooling node, storage appliance, power appliance, cooling appliance, system hardware with network access, or a combination thereof. The first communication device 112 may serve as a primary communication device while the second communication device 114 may serve as a secondary communication device (e.g., backup communication device, replacement communication device, alternate communication device on stand-by).

Input power port 107 is connectable to external power source 116. In some implementations, first communication device 112 and external power source 116 are the same device. In some implementations, external power source 116 includes a control system for controlling power supplied via a USB port connected to input power port 107, as will be described in more details herein.

In some implementations, external power source 116 is an infrastructure management (IM) device. The IM device may be, for instance, a modular infrastructure management system that provides modular slots to receive communication card modules. For example, the IM device may provide a modular slot that receives a USB card connectable to the input power port 107. Power supplied via the USB card may be controlled by the IM device. In some implementations, the first communication device 112 is also the IM device. When power supplied via the USB card is turned off during maintenance of the IM device 112, network bypass apparatus 100 enters the bypass mode, while second communication device 114 takes over. Once the maintenance is completed, the IM device 112 may turn power supplied via the USB card back on to enable normal mode of network bypass apparatus 100.

Output power port 108 is connectable to external device 118. External device 118 receives power from output power port 108. In some implementations, external device 118 is another network bypass apparatus connected to the network bypass apparatus 100 in a daisy-chain configuration.

Figure 2:
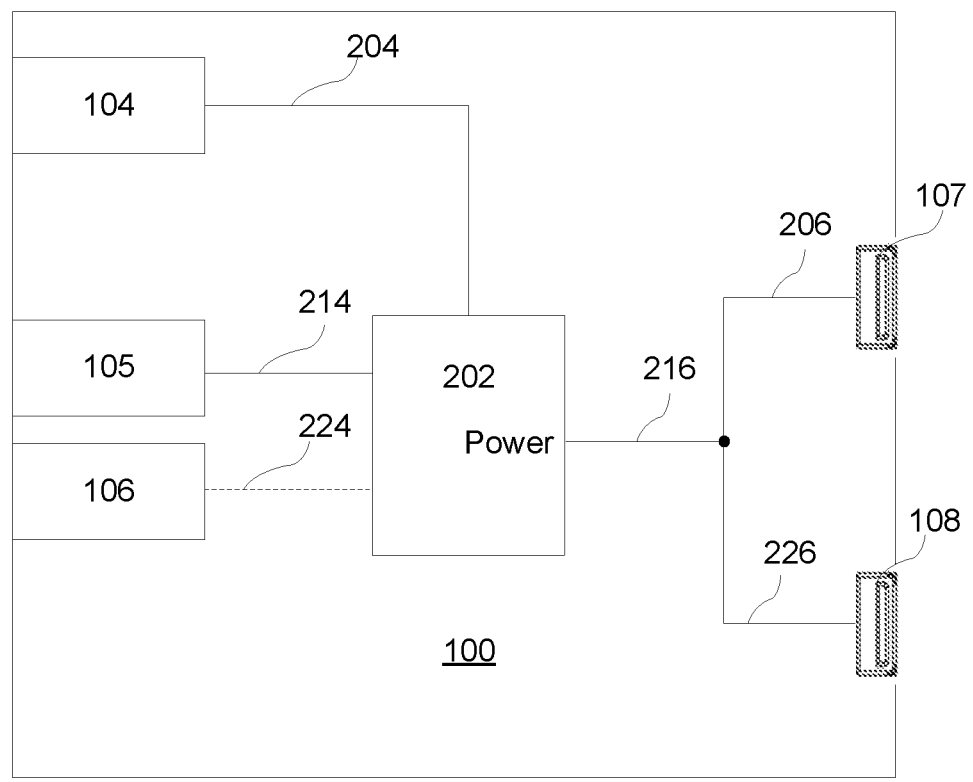
FIG. 2 shows an exemplary network bypass apparatus operating in normal mode.

FIG. 2 shows an exemplary network bypass apparatus 100 operating in normal mode. Network bypass apparatus 100 includes a relay 202, which is a switch that is activated (or deactivated) by a control signal. Relay 202 may be an electrical or optical switch that responds to the control signal. The control signal is supplied by receiving power at input power port 107. Relay 202 may include, for example, a solid-state relay that employs power semiconductor devices such as thyristors and transistors.

First, second and third connection interfaces (104, 105, 106) may be physically connected to network device 110, and first and second communication devices (112, 114) respectively. Input and output power ports (107, 108) may be physically connected to external power source 116 and external device 118. Relay 202 may be connected to first, second and third connection interfaces (104, 105, 106) via connections (204, 214, 224). Relay 202 is further connected to input and output power ports (107, 108) via connections (206, 216, 226). The solid lines indicate that there is electrical communication in the connections (204, 214) between the relay 202 and the first and second connection interfaces (104, 105). The broken line indicates that there is no electrical communication in connection 224 between relay 202 and third connection interface 106, even though there may be a network cable from second communication device 114 plugged into third connection interface 106.

External power source 116 provides power to the relay 202 via input power port 107 and connections (206, 216) to enable normal mode. In response to receiving the power, relay 202 communicatively couples first and second connection interfaces (104, 105) and communicatively decouples first and third connection interfaces (104, 106). Network data from network device 110 may then be communicated to first communication device 112, and second communication device 114 is on standby and does not receive any network data.

Figure 3:
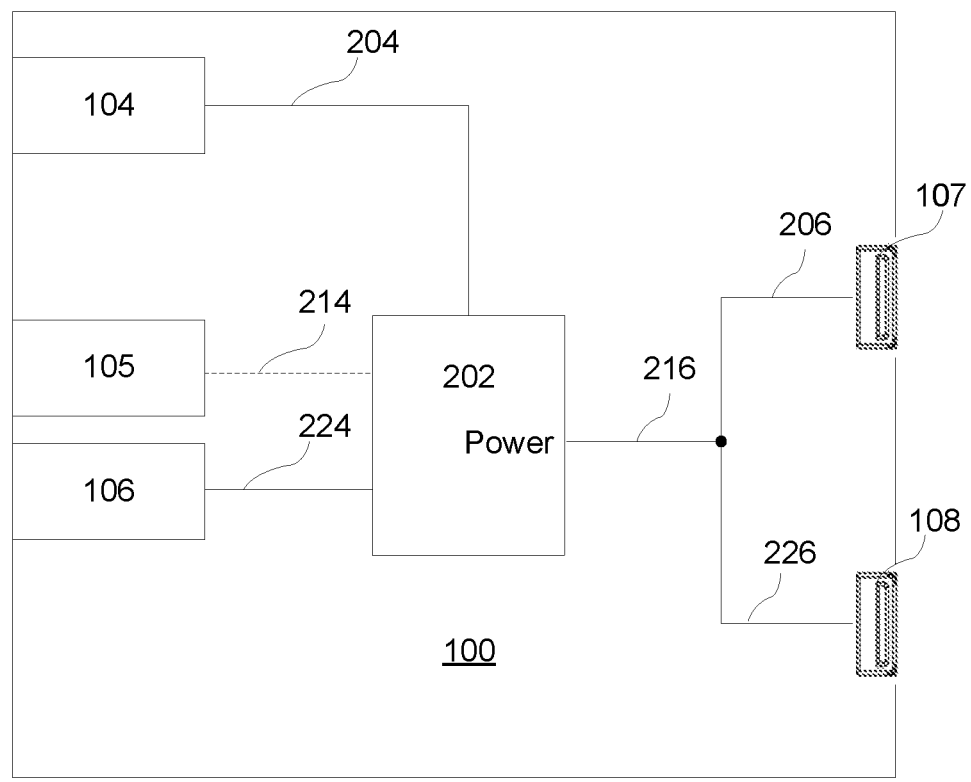
FIG. 3 shows an exemplary network bypass apparatus operating in bypass mode.

FIG. 3 shows an exemplary network bypass apparatus 100 operating in bypass mode. First, second and third connection interfaces (104, 105, 106) may be physically connected to network device 110, and first and second communication devices (112, 114) respectively. Input and output power ports (107, 108) may be physically connected to external power source 116 and external device 118. Relay 202 may be connected to first, second and third connection interfaces (104, 105, 106) via connections (204, 214, 224). Relay 202 is further connected to input and output power ports (107, 108) via connections (206, 216, 226). The solid lines indicate that there is electrical communication in the connections 204 and 224 between the relay 202 and the first and third connection interfaces (104, 106). The broken line indicates that there is no electrical communication in connection 214 between relay 202 and second connection interface 105, even though there may be a network cable from first communication device 112 plugged into second connection interface 105.

External power source 116 disconnects or removes power to the relay 202 via input power port 107 and connections (206, 216) to enable bypass mode. In response to the disconnection of power, relay 202 communicatively decouples first and second connection interfaces (104, 105) and communicatively couples first and third connection interfaces (104, 106). Network data from network device 110 may then be communicated to second communication device 114, and first communication device 112 is on standby and does not receive any network data.

Accordingly, network bypass apparatus 100 provides a mechanism to route the network data from the network device 110 to either the first communication device 112 or second communication device 114 that may be in active or standby mode. Network bypass apparatus 100 accomplishes the routing of the network data to the first and second communication devices (112, 114) with and without power.

Figure 4:
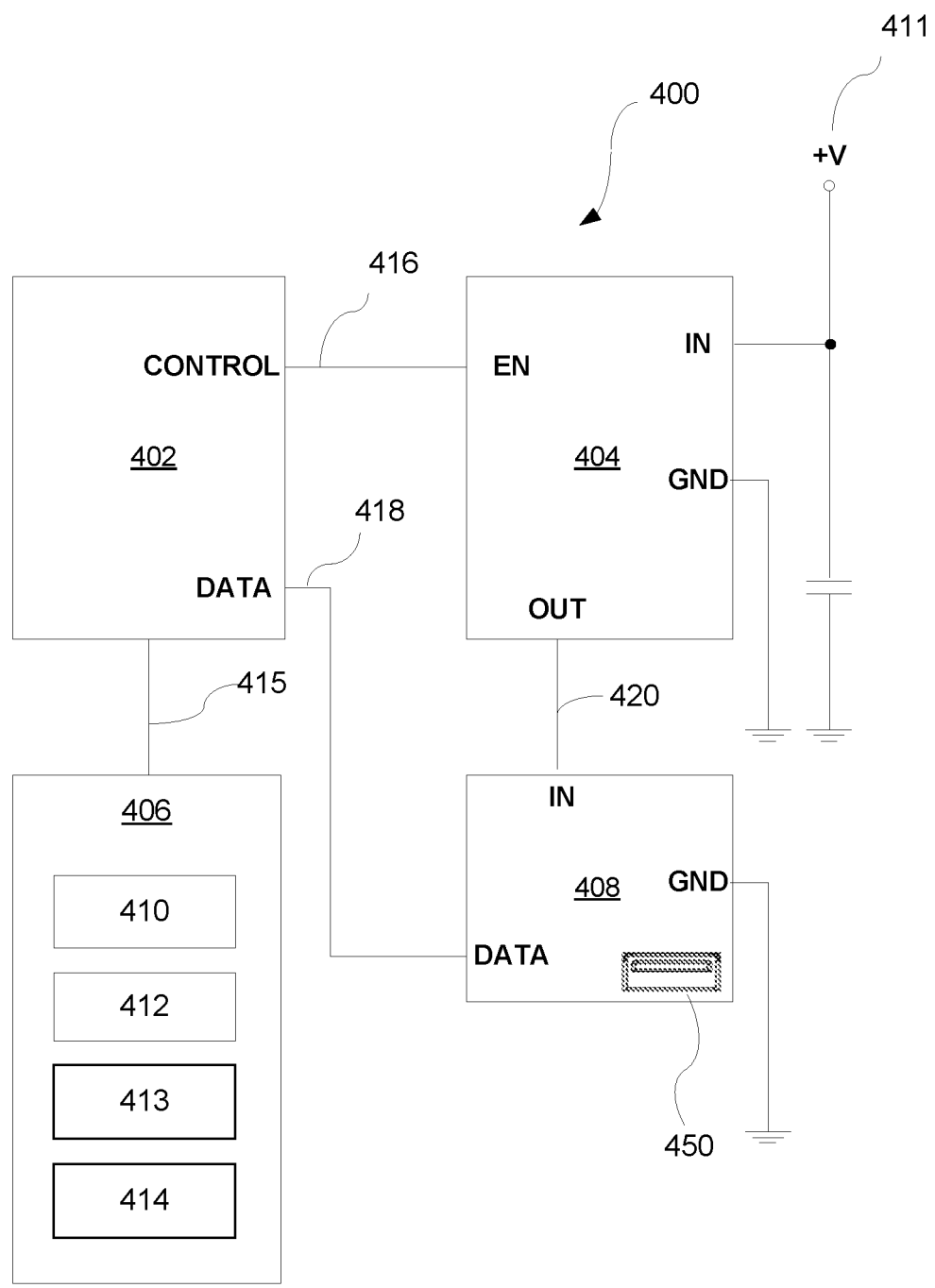
FIG. 4 shows an exemplary control system for controlling power supplied via USB port.

FIG. 4 shows an exemplary control system 400 for controlling power supplied via USB port 450. USB port 450 may be connected to input power port 107 on network bypass apparatus 100 via, for example, a USB cable. Exemplary control system 400 may be implemented on external power source 116 (e.g., IM device) to control power supplied to relay 202 via input power port 107. In some implementations, control system 400 includes a processor device 402 coupled to one or more non-transitory computer-readable media 406 (e.g., memory device), power control unit 404 and USB interface 408. Control system 400 may further include support circuits such as a cache, clock circuits and a communications bus. Various other peripheral devices, such as additional data storage devices and IT devices, may also be connected to the control system 400.

The present technology may be implemented in various forms of hardware, software, firmware, special purpose processors, or a combination thereof, either as part of the microinstruction code or as part of an application program, device driver or software product, or a combination thereof, which is executed via the operating system (OS). In some implementations, the techniques described herein are implemented as computer-readable program code tangibly embodied in one or more non-transitory computer-readable media 406. In particular, the present techniques may be implemented by a device driver 410, control application 412 and configuration engine 413. Device driver 410 and control application 412 may be implemented as part of the operating system (OS). Non-transitory computer-readable media 406 may further include a configuration dataset 414.

Device driver 410 enables an IT device and/or a communication device to communicate with the OS via USB port 450. Control application 412 is a component of the OS that serves as a device manager to allow viewing and management of IT and/or communication devices installed in control system 400. Configuration engine 413 may generate an interface to configure and/or manage control system 400. The interface may include a user interface made available via, for example, a command line interface (CLI), a web interface, programmatically via an application programmable interface (API), or a combination thereof. Configuration engine 413 may generate, store, read and/or update configuration data in configuration dataset 414. The configuration data may include power enablement information, which may comprise, for example, power enablement parameters and power states for individual USB ports.

Non-transitory computer-readable media 406 is communicatively coupled to processor device 402 via a data bus 415. Non-transitory computer-readable media 406 may include random access memory (RAM), read-only memory (ROM), magnetic floppy disk, flash memory, an in-memory data store, an on-disk data store, a local data store, a remote data store, a distributed data store, a replicated data store, other types of memories, or a combination thereof. The computer-readable program code is executed by processor device 402 to process data provided by, for example, configuration dataset 414. The computer-readable program code is not intended to be limited to any particular programming language and implementation thereof. It will be appreciated that a variety of programming languages and coding thereof may be used to implement the teachings of the disclosure contained herein.

USB interface 408 includes at least one USB port 450 for providing a connection between the control system 400 and an external device (e.g., network bypass apparatus 100). USB interface 408 receives data from the processor device 402 via data line 418. In some implementations, power supplied to the USB port 450 is controlled by power control unit 404, device driver 410 and control application 412.

Power control unit 404 is coupled to processor device 402 via a control line 416. Power control unit 404 is further coupled to the USB interface 408 via power line 420 to provide power to the USB port 450. Although only one power control unit 404 and one USB interface 408 are shown, it should be appreciated that multiple power control units may be provided to supply power to multiple USB interfaces. One power control unit 404 may be coupled to one corresponding USB interface 408. Multiple power control units 404 may be coupled to the processor device 402 via multiple control lines 416. Each control line 416 may control one or more power control units 404.

The initial state of power for the USB port 450 may be defined by the power control unit 404 until control application 412 determines the new power state based on power enablement information. Control system 400 may define the initial state of the USB port 450 as disabled, so no power is applied to the USB port 450 and to any device coupled to the USB port 450 until the control application 412 determines the power state based on the power enablement information. Control application 412 may cause the processor device 402 to enable the power control unit 404 via control line 416. Upon enablement by processor device 402, power control unit 404 supplies power from the power source 411 to the USB interface 408 via power line 420, which then supplies power to the USB port 450. When control application 412 causes the processor device 402 to disable the power control unit 404 via control line 416, power control unit 404 disconnects the power supplied by power source 411 via power line 420, thereby disconnecting power to USB port 450.

Figure 5:
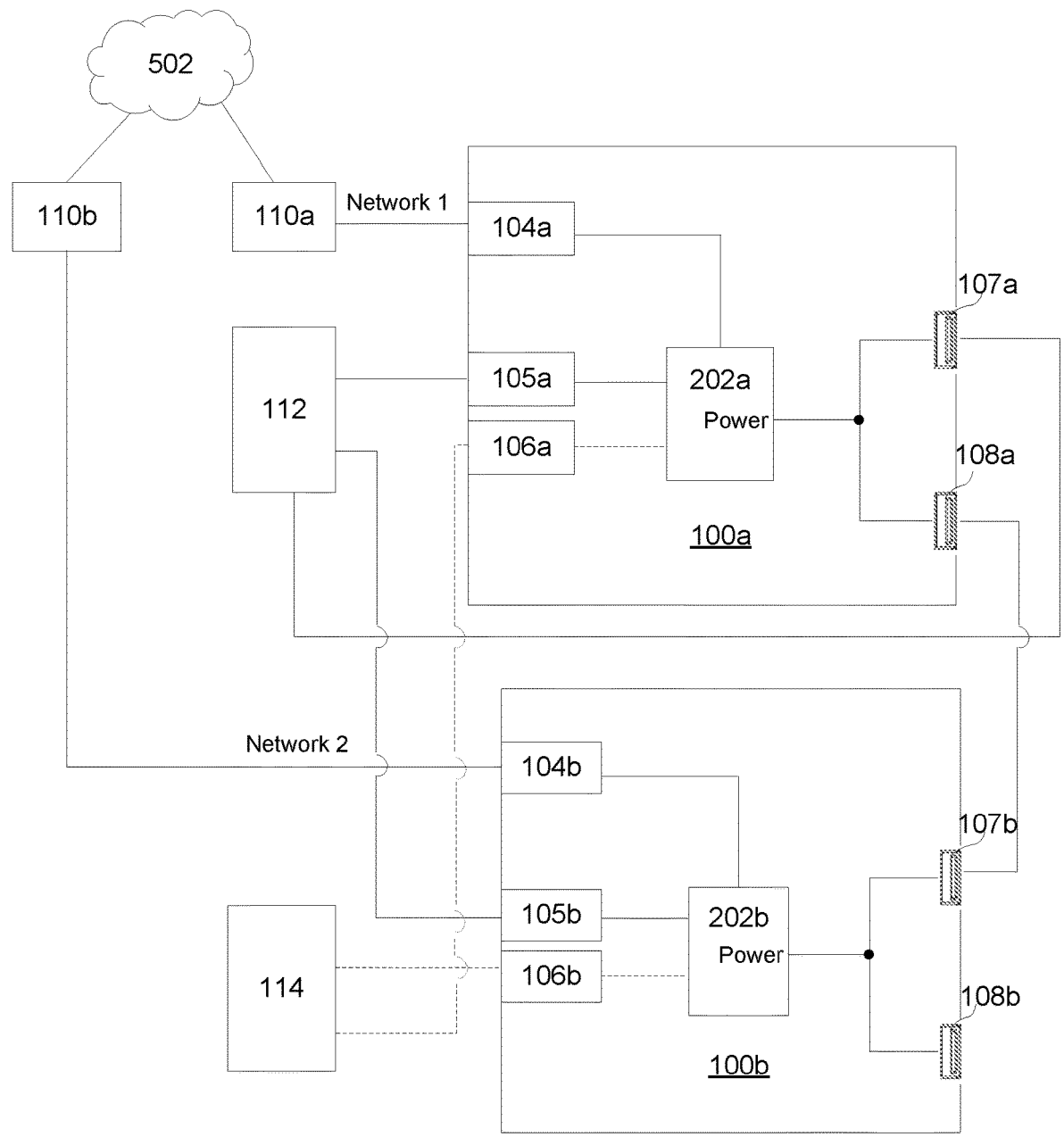
FIG. 5 shows an exemplary daisy-chain configuration of first and second network bypass apparatuses operating in normal mode.

FIG. 5 shows an exemplary daisy-chain configuration 500 of first and second network bypass apparatuses operating in normal mode. First and second network bypass apparatuses 100a-b are physically connected to first communication device 112 via second connection interfaces 105a-b and second communication device 114 via third connection interfaces 106a-b. First network bypass apparatus 100a is connected to first network device 110a via first connection interface 104a, while second network bypass apparatus 100b is connected to second network device 110b via first connection interface 104b. First and second network devices 110a-b connects to first and second networks. First and second networks may be different networks. First and second network devices 110a-b may further be connected to the Internet 502.

In this example, first communication device 112 is active (ON), while second communication device 114 is on standby. First communication device 112 supplies power to input power port 107a of first network bypass apparatus 100a, which supplies power to the relay 202a. In response to receiving the power, relay 202a routes network data from first network device 110a via first connection interface 104a to first communication device 112 via second connection interface 105a. Second communication device 114 is communicatively decoupled from first network device 110a and does not receive any network data.

Output power port 108a of first network bypass apparatus 100a is connected to the input power port 107b of second network bypass apparatus 100b. Accordingly, relay 202b receives power from first network bypass apparatus 100a via input power port 107b. In response to receiving power, relay 202b routes network data from second network device 110b via first connection interface 104b to first communication device 112 via second connection interface 105b. Second communication device 114 is communicatively decoupled from second network device 110b and does not receive any network data.

Figure 6:
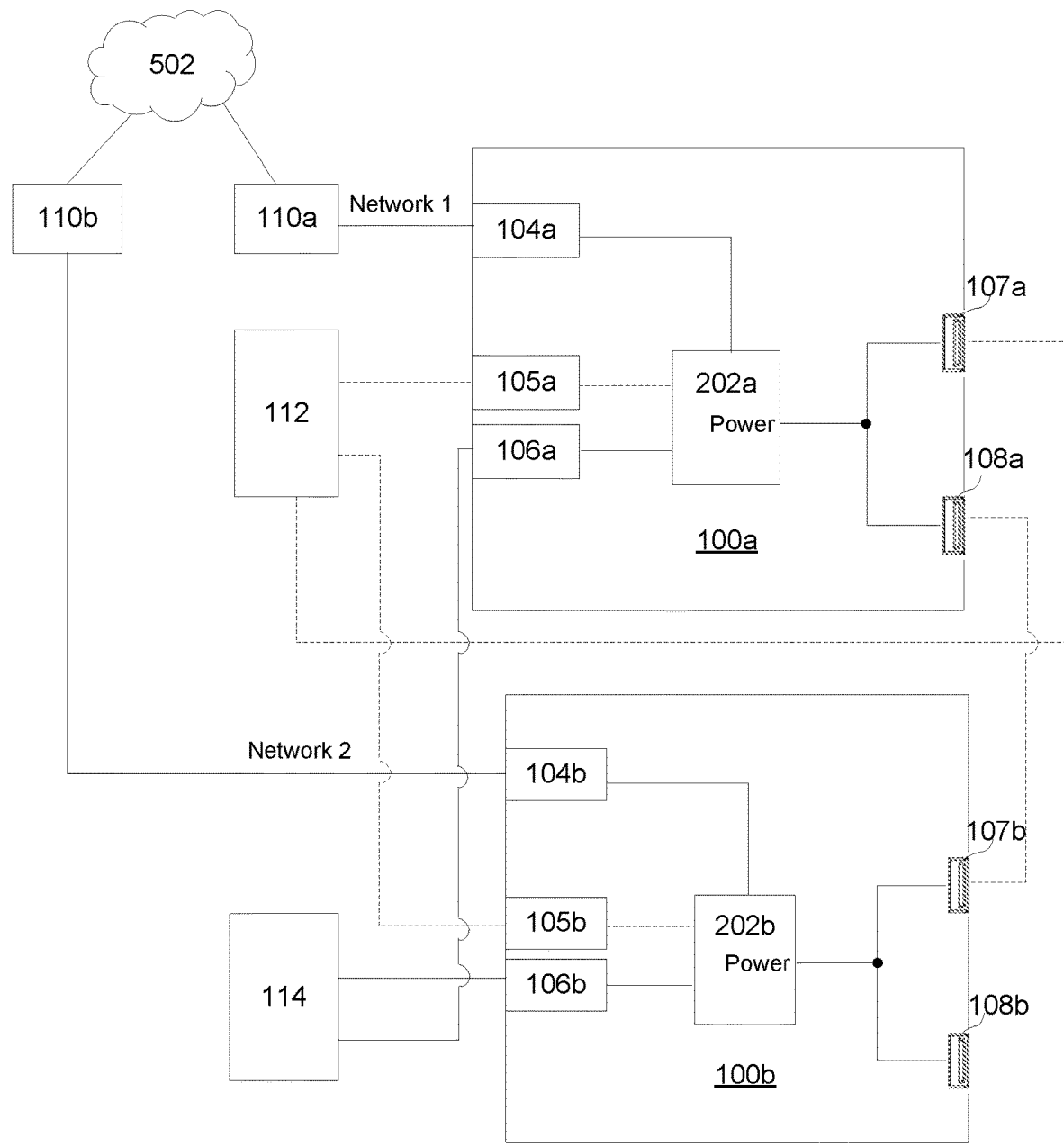
FIG. 6 shows an exemplary daisy-chain configuration of first and second network bypass apparatuses operating in bypass mode.

FIG. 6 shows an exemplary daisy-chain configuration 600 of first and second network bypass apparatuses 100a-b operating in bypass mode. In this example, first communication device 112 is on standby, while second communication device 114 is active (ON). First communication device 112 disconnects or removes power to input power port 107a of first network bypass apparatus 100a, which disconnects power to the relay 202a. In response to the disconnection of power, relay 202a routes network data from first network device 110a via first connection interface 104a to second communication device 114 via third connection interface 106a. First communication device 112 is communicatively decoupled from first network device 110a and does not receive any network data.

Power is also disconnected from output power port 108a of first network bypass apparatus 100a in response to the disconnection of power from input power port 107a. Output power port 108a of first network bypass apparatus 100a is connected to the input power port 107b of second network bypass apparatus 100b. No power is received by relay 202b via input power port 107b. In response to the disconnection of power, relay 202b routes network data from second network device 110b via first connection interface 104b to second communication device 114 via third connection interface 106b. First communication device 112 is communicatively decoupled from second network device 110b and does not receive any network data.

Figure 7:
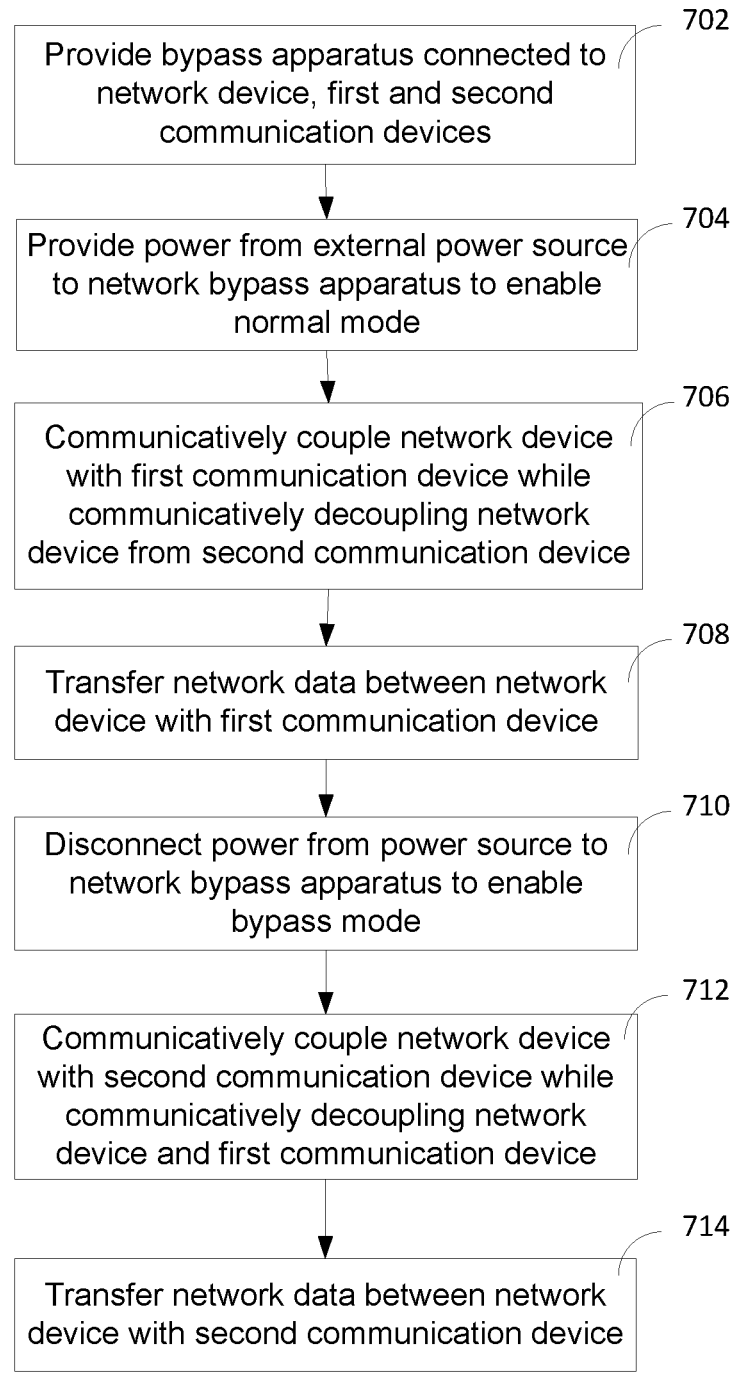
FIG. 7 shows an exemplary network bypass method.

FIG. 7 shows an exemplary network bypass method 700. It should be understood that the steps of the method 700 may be performed in the order shown or a different order. Additional, different, or fewer steps may also be provided. Further, the method 700 may be implemented with the network bypass apparatus 100 of FIGS. 1a, 1b 2 and/or 3, control system 400 of FIG. 4, network bypass apparatuses 100a-b of FIGS. 5-6, a different system, or a combination thereof.

At 702, a network bypass apparatus 100 is provided. Network bypass apparatus 100 is connected to network device 110, first and second communication devices (112, 114) via first, second and third connection interfaces (104, 105, 106). For example, a network cable is inserted in first connection interface 104 to connect the network bypass apparatus 100 to network device 110. Output network cables may be inserted in second and third connection interfaces (105, 106) to connect the network bypass apparatus 100 to first and second communication devices (112, 114).

At 704, power is applied to network bypass apparatus 100 to enable the normal mode. In some implementations, the power is applied by external power source 116 via input power port 107. External power source 116 may apply the power using the control system 400. For example, control application 412 may cause the processor device 402 to enable the power control unit 404 via control line 416. Upon enablement by processor device 402, power control unit 404 supplies power from the power source 411 to the USB interface 408 via power line 420, which then applies power via USB port 450 connected to input power port 107 on network bypass apparatus 100. In some implementations, power is also applied to output power port 108 since output power port 108 is connected to input power port 107.

At 706, in response to the application of power, network bypass apparatus 100 communicatively couples network device 110 and first communication device 112, while communicatively decoupling network device 110 and second communication device 114.

At 708, network data is transferred between network device 110 and first communication device 112.

At 710, power is removed or disconnected from the network bypass apparatus 100 to enable bypass mode. In some implementations, the power is disconnected by external power source 116. External power source 116 may disconnect the power using the control system 400. For example, control application 412 may cause the processor device 402 to disable the power control unit 404 via control line 416. Power control unit 404 then disconnects the power supplied by power source 411 via power line 420, thereby disconnecting power via USB port 450 connected to first connection interface 104 on network bypass apparatus 100. In some implementations, power is also disconnected from output power port 108 since output power port 108 is connected to input power port 107.

At 712, network bypass apparatus 100 communicatively decouples network device 110 and first communication device 112, while communicatively coupling network device 110 and second communication device 114.

At 714, data is transferred between network device 110 and second communication device 114.

It is to be further understood that, because some of the constituent system components and method steps depicted in the accompanying figures can be implemented in software, the actual connections between the systems components (or the process steps) may differ depending upon the manner in which the present framework is programmed. Given the teachings provided herein, one of ordinary skill in the related art will be able to contemplate these and similar implementations or configurations of the present framework.

While various embodiments have been described above, it should be understood that they have been presented by way of example, and not limitation. It will be apparent to persons skilled in the relevant art(s) that various changes in form and detail can be made therein without departing from the spirit and scope. In fact, after reading the above description, it will be apparent to one skilled in the relevant art(s) how to implement alternative embodiments. Thus, the present embodiments should not be limited by any of the above-described exemplary embodiments. In particular, it should be noted that, for example purposes, the presently described embodiments are discussed with respect to a data center. However, one skilled in the art will recognize that embodiments may be employed to other collections of IT devices over, for example, a distributed network not confined by a single data center, a small collection of IT devices in an Intranet, combinations thereof, and/or the like.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

What is claimed is:

1. A network bypass apparatus, comprising:
   a relay;
   an input power port connectable to and disconnectable from an external input power source;
   a first connection interface comprising a first port connectable to and disconnectable from a network device;
   a second connection interface comprising a second port connectable to and disconnectable from a first communication device;
   a third connection interface comprising a third port connectable to and disconnectable from a second communication device;
   a housing for housing the relay and the first, second and third connection interfaces, wherein the network device, the first communication device and the second communication device are external devices of the network bypass apparatus; and
   wherein
      when external power is applied to the relay, the network bypass apparatus is configured to operate in a normal mode, the normal mode comprises communicatively coupling the first communication interface with the second communication interface while communicatively decoupling the third communication interface from the first communication interface, and
      when external power is disconnected from the relay, the network bypass apparatus is configured to operate in a bypass mode, the bypass mode comprises communicatively coupling the first communication interface with the third communication interface while communicatively decoupling the second communication interface from the first communication interface.

2. The network bypass apparatus of claim 1 wherein the external power is provided by a first network device connected to the first connection interface.

3. The network bypass apparatus of claim 1 wherein the first, second and third ports comprise network ports.

4. The network bypass apparatus of claim 1 wherein the first connection interface is connected to a router, switch, modem, internet service provider (ISP) device, long term evolution (LTE) device, digital subscriber line (DSL) device, cable modem, firewall, Ethernet card, network card, repeater, gateway, or a combination thereof.

5. The network bypass apparatus of claim 1 further comprising an output power port connectable to another external device.

6. The network bypass apparatus of claim 1 wherein the input power port comprises a universal serial bus (USB) port.

7. The network bypass apparatus of claim 1 wherein an external power source is connected to the input power port to provide the external power.

8. The network bypass apparatus of claim 7 wherein the external power source comprises a control system that controls the external power supplied to the relay via the input power port.

9. The network bypass apparatus of claim 1 further comprising an output power port connectable to an external device.

10. The network bypass apparatus of claim 9 wherein the external device comprises another network bypass apparatus.

11. The network bypass apparatus of claim 9 wherein the output power port comprises a universal serial bus (USB) port.

12. A network bypass method, comprising:
    providing a network bypass apparatus which includes
       an input power port connectable to and disconnectable from a power source;
       a relay,
       a first connection interface comprising a first port,
       a second connection interface comprising a second port,
       a third connection interface comprising a third port connectable to a second communication device,
       a housing for housing the relay and the first, second and third connection interfaces;
    connecting a network device to the first port, the network device is external to the housing;
    connecting a first communication device to the second port, the network device is external to the housing;
    connecting a second communication device to the third port, the network device is external to the housing;
    configuring the network bypass apparatus to operate in normal mode by applying external power to the relay to couple the first communication interface to the second communication interface and to communicatively decouple the first communication interface from the third communication interface;
    and
    transferring first network data between the network device and the second communication device.

13. The network bypass method of claim 12, further comprises:
    configuring the network bypass apparatus to operate in a bypass mode by disconnecting the external power to communicatively couple the first communication interface to the third communication interface and to communicatively decouple the first communication interface from the second communication interface; and
    transferring first network data between the network device and the second communication device.

14. The network bypass method of claim 12, comprises connecting an external power source to the input power port to provide the external power to the network bypass apparatus.

15. The network bypass method of claim 12 wherein the external power is provided by the network device connected to the first port.

16. The network bypass method of claim 12 wherein:
the network bypass apparatus further comprises an output power port; and
connecting an external device to the output power port.

17. The network bypass method of claim 16 wherein the external device comprises another network bypass apparatus.

18. A network bypass system, comprising:
a network bypass apparatus having
an input power port;
a relay,
a first connection interface comprising a first port connectable to and disconnectable from a network device,
a second connection interface comprising a second port connectable to and disconnectable from a first communication device,
a third connection interface comprising a third port connectable to and discounnectable from a second communication device, and
a housing for housing the relay and the first, second and third connection interfaces;
one or more non-transitory computer-readable media, which is external to the housing of the bypass network apparatus, for storing computer-readable program code; and
at least one processor, which is external to the housing of the bypass network apparatus, in communication with the one or more non-transitory computer-readable media, wherein the at least one processor is operative with the computer-readable program code to perform operations including configuring the network bypass apparatus to operate in a normal mode by applying external power to the relay to communicatively couple the first connection interface to the second connection interface and to communicatively decouple the first connection interface from the third connection interface, and configuring the network bypass apparatus to operate in a bypass mode by disconnecting external power to the relay to communicatively couple the first connection interface to the third connection interface and to communicatively decouple the first connection interface from the second connection interface.

19. A network bypass system of claim 18, wherein the external power is provided by a network device connected to the first port.

20. A network bypass system of claim 18, wherein the external power is provided by an external power source connected to the input power port.

* * * * *